United States Patent

Hsu

[11] Patent Number: 5,074,728
[45] Date of Patent: Dec. 24, 1991

[54] DRILL-COEXISTENT SCREW

[76] Inventor: Kun-Shan Hsu, c/o Hung Hsing Patent Service Center, P.O. Box 55-1670, Taipei, Taiwan

[21] Appl. No.: 685,632

[22] Filed: Apr. 16, 1991

[51] Int. Cl.⁵ ............................................. F16B 25/00
[52] U.S. Cl. ................................... 411/387; 411/304; 411/369; 411/915
[58] Field of Search ............... 411/386, 387, 369, 915, 411/421, 303, 304, 370

[56] References Cited

U.S. PATENT DOCUMENTS

| 3,738,218 | 6/1973 | Gutshall | 411/387 |
| 4,241,639 | 12/1980 | Baer | 411/387 |
| 4,697,969 | 10/1987 | Sparkes | 411/387 |
| 4,978,350 | 12/1990 | Wagenknecht | 411/387 |

Primary Examiner—Neill R. Wilson

[57] ABSTRACT

A screw includes a drill point formed on a root portion of a threaded shank of the screw having a plurality of helix flutes helically formed in the screw emerging from the drill point through the threaded shank and a plurality of packing rings annularly secured on the shank so as for a firm fixation of the screw in a wall or article to be fastened without being pre-drilled by a drill tool.

1 Claim, 1 Drawing Sheet

DRILL-COEXISTENT SCREW

BACKGROUND OF THE INVENTION

A conventional screw is formed with threaded cylindrical rod engageable with a similarly threaded cylindrical hole formed in a wall or an article to be fastened by the screw. The threaded cylindrical hole should be pre-drilled by a drill tool so that the screw can be engaged with the threaded hole for fastening the screw in the hole for fastening or fixing purpose. However, such a conventional screw still has the following drawbacks:

1. A tool of drill must be provided for drilling the female threaded hole for plugging in the screw as driven by another tool such as a driver to cause operating inconvenience.

2. If the threaded hole is not made precisely to be engageable with the screw threads, the screw fixed in the threaded hole may be loosened or easily released from the hole, influencing its fastening effect.

The present inventor has found the defects of a conventional screw and invented the present screw coexistent with a drill.

SUMMARY OF THE INVENTION

The object of the present invention is to provide a screw including a drill point formed on a root portion of a threaded shank of the screw having a plurality of helix flutes helically formed in the screw emerging from the drill point through the threaded shank and a plurality of packing rings annularly secured on the shank so as for a firm fixation of the screw in a wall or article to be fastened without being pre-drilled by a drill tool.

DETAILED DESCRIPTION

Figure 2:
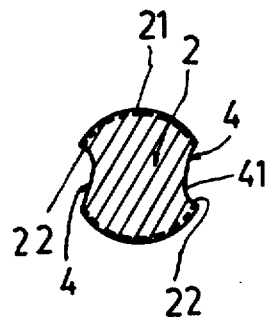
FIG. 2 is a cross sectional drawing of the present invention when viewed from 2—2 direction of FIG. 1.
Figure 1:
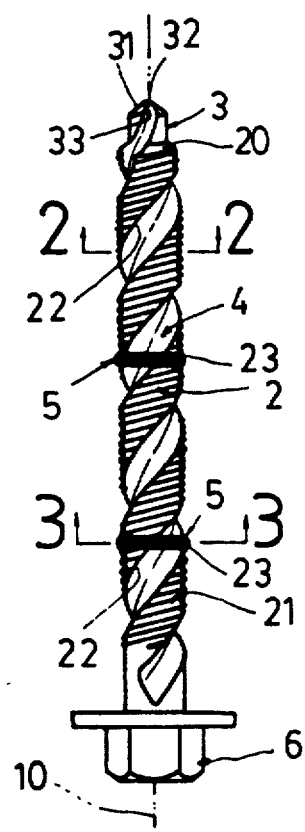
FIG. 1 is an illustration of the present invention.
Figure 3:
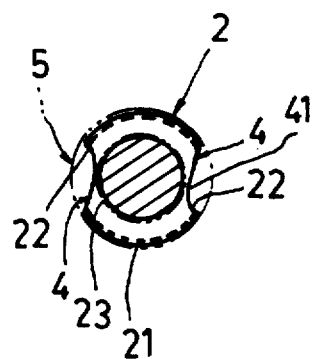
FIG. 3 is a cross sectional drawing of the present invention when viewed from 3—3 direction of FIG. 1.

As shown in FIGS. 1-3, the present invention comprises a drill-coexistent screw 1 including: a threaded shank 2, a drill portion 3 formed on a first end portion of the screw 1, a plurality of helix flutes 4 formed in the screw 1, a plurality of packing rings 5 engageably retained on the shank 2, and a head portion 6 formed on a second end portion of the screw 1.

The threaded shank 2 includes: a root portion 20 having the drill portion 3 secured on the root portion 20, a threaded portion 21 helically formed on the shank 2, and a plurality of annular grooves 23 annularly recessed in the shank 2 perpendicular to a longitudinal axis 10 formed in the screw 1.

The drill portion 3 secured on the root portion 20 of the shank 2 includes: a drill point 31 having a chisel edge 32 formed on a front end portion of the drill portion 3.

A plurality of helix flutes 4 are each helically formed in the screw 1 emerging from the drill point 31 and helically recessed in the drill point 31 and the shank 2 to continuously form a drill lip 33 on the drill portion 3 and a screw lip 22 on the shank 2 following the drill lip 33 for cutting threads in a hole of a fixing wall actually drilled by the drill point 31.

As shown in FIG. 3, each annular groove 23 has an inside diameter smaller than an inside diameter projectively and circumferentially defined by a bottom portion 41 of the helix flute 4 recessed in the shank 2 so that a packing ring 5 made of elastic material can be engaged with the groove 23.

For fastening the screw 1 of the present invention in a wall or an article, a driving tool such as a pneumatic tool, an electric tool, a screw driver, a wrench or other tools may be applied to clamp the head portion 6 of the screw 1 for rotatably fixing the screw 1 into the wall or article (not shown).

The drill portion 3 may first drill a hole in the wall or article surface. The lips 22, 33 formed on the drill portion 3 and the shank 2 will continuously cut the wall or article for a drilling operation as driven by the tool for helically plugging the screw 1 into the wall or article along the threaded portion 21 of the shank 2 until reaching a final fixing position. The scraps or scales drilled by the screw 1 will be backwardly discharged through the flutes 4. The packing rings 5 will serve to well seal a threaded hole formed in the wall or article to prevent releasing of the screw already fastened in the wall.

Therefore, the present invention is superior to a conventional screw or bolt with the following advantages:

1. The drill 3 is formed in situ in the screw 1 so that the screw 1 can be directly immediately fixed in a wall without requiring an additional drilling tool for drilling a threaded hole for the screw for saving operation and maintenance cost and also for enhancing an operation convenience for a screw-fastening job.

2. The drilling operation and screw fastening operation can be completed simultaneously for a precise assembly work for preventing a loosening or releasing of a screw already fixed in a wall.

Naturally, the materials for making the screw 1 of the present invention should be carefully selected for a suitable hardness, strength, toughness and other mechanical properties of the screw raw materials for ensuring a safety and longer service life of the present screw.

The structure, shapes, materials and screw or bolt kinds of the present invention are not limited and can be suitably modified by those skilled in the art.

I claim:

1. A screw comprising:
    a threaded shank including a root portion formed on a first end portion of the shank, a threaded portion helically formed on the shank and a head portion formed on a second end portion of said shank opposite to the root portion;
    a drill portion secured to the root portion of said shank having a drill point formed on a front end portion of said drill portion and formed with a chisel edge on said drill point; and
    a plurality of helix flutes helically formed in said screw each said helix flute emerging from said drill point of said drill portion and helically recessed in said drill point and said shank to continuously form a drill lip on said drill portion and a screw lip on said shank following said drill lip, whereby upon a rotating of said screw, said drill portion will drill a hole in a fixing wall, and said screw lip will cut threads in said hole in said fixing wall for a helical engagement of the threaded portion of said shank with said hole in the fixing wall;
    said shank of said screw formed with a plurality of annular grooves each said groove annularly formed in said shank perpendicular to a longitudinal axis of said screw, and each said annular groove engaged with a packing ring therein; and
    each said annular groove having an inside diameter smaller than an inside diameter projectively and circumferentially defined by a bottom portion of the helix flute recessed in said shank.

* * * * *